Feb. 3, 1931.   F. R. KLAUS ET AL   1,791,466
WHEEL AND RIM STRUCTURE
Filed June 21, 1928   2 Sheets-Sheet 1
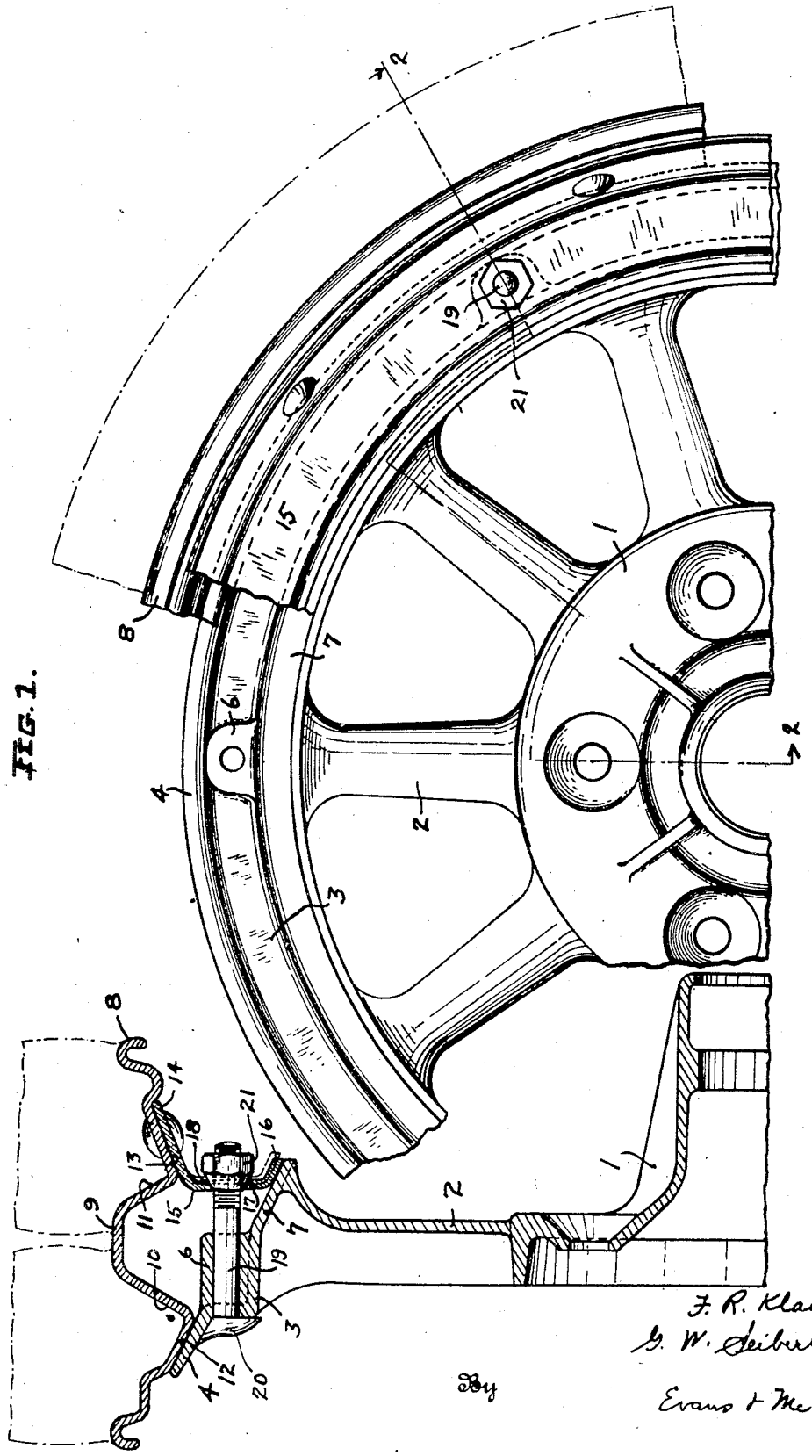
Inventors
F. R. Klaus
G. W. Seiberling
By Evans & McCoy
Attorneys Patented Feb. 3, 1931

1,791,466

UNITED STATES PATENT OFFICE

FRED R. KLAUS, OF WARREN, AND GEORGE W. SEIBERLING, OF AKRON, OHIO; SAID KLAUS ASSIGNOR TO THE AMERICAN WELDING & MANUFACTURING COMPANY, OF WARREN, OHIO, A CORPORATION OF OHIO, AND SAID SEIBERLING ASSIGNOR TO THE LAMBERT TIRE & RUBBER COMPANY, OF AKRON, OHIO, A CORPORATION OF OHIO

WHEEL AND RIM STRUCTURE

Application filed June 21, 1928. Serial No. 287,269.

This invention relates to wheels for motor vehicles and more particularly to wheels of the type in which a tire base is detachably mounted upon the body of the wheel.

Cushion tires require a more rigid support than pneumatic tires and for this reason, the usual practice has been to mount the tires on heavy tire bases and to press the tire bases onto the felloe of the wheel.

The present invention has for an object to provide a demountable mounting for cushion tire bases which provides a rigid support for the tire base throughout its periphery.

A further object is to provide a tire base with a continuous internal mounting flange which is rigidly attached thereto and which stiffens the tire base to such an extent that it is practicable to make the tire base and flange of relatively light rolled sections.

It is common practice to provide rear wheels of trucks with tires of wider tread than the front wheels by reason of the fact that the rear wheels support a greater portion of the load, dual or twin tread tires being commonly mounted on the rear wheels and single tread tires on the front wheels. Also, the width of cushion tires employed on trucks varies with the loads which the trucks are designed to carry.

Heretofore it has been the practice to provide wheels of different construction for the front and rear of a truck and also to provide a special wheel for each width of tire tread.

The present invention has for an important object to provide a universal mounting for cushion tires which will permit a single standard wheel to be used for any width of tire so that the cost of manufacture of trucks may be materially reduced by using a single standard wheel at the front and rear of each truck and for trucks of various load capacities.

A further object of the invention is to provide a mounting for tire bases of various widths on a wheel body in which the mounting thrusts are carried solely by the clamping nuts and in which the clamping bolts are not subjected to shearing or bending stresses.

A further object is to provide a demountable tire base structure having as an integral part thereof a continuous internal mounting flange adapted to have wedging engagement with a peripheral seat on the wheel body and to provide a continuous rigid support for the tire base.

A further object is to provide a tire base with a continuous internal mounting flange which is adapted, when tightened on the wheel body, to exert radial outward pressure on the tire base due to its wedging engagement with the wheel body and which is so constructed that the action of the clamping means thereon tends to expand the same to a larger diameter whereby an increased outward thrust is obtained.

A further object is to provide a mounting flange which has a certain amount of resilience and lateral flexibility permitting a slight deflection thereof upon tightening the clamping nuts to permit the flange to be deflected laterally a short distance to bring it into engagement with its seat so that the pressure of the clamping nuts tends to rock the flange about its seating edge as a fulcrum and to thereby exert pressure outwardly against the interior of the tire base, the resiliency of the flange also causing the flange to act as a spring lock washer against the clamping nuts to securely hold them against turning movements once they are screwed tight against the flange.

A further object is to provide a demountable mounting for tire bases in which the clamping bolts serve to transmit driving thrusts to the tire base.

A further object is to provide a demountable mounting for cushion tires in which a tire base unit is employed which has wedging engagement with the peripheral portion of the wheel body along opposite side edges thereof and in which clamping bolts are mounted to the outboard side of one of the seats and to the inboard side of the other seat and coact with the tire base unit to apply direct lateral pressure upon portions thereof engaging both seats.

A further object is to provide a wheel body which has relatively wide seats at opposite edges of its periphery, which taper toward the outboard side of the wheel, the seats being of different diameters so that the wheel body is adapted to receive the tire bases of various widths.

With the above and other objects in view, this invention comprises the wheel structure as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of the specification in which:

Figure 1 is a fragmentary side elevation of a motor vehicle wheel with a portion of the tire broken away to show the peripheral or felloe portion of the wheel body.

Fig. 2 is a transverse section taken on the line indicated at 2—2 in Fig. 1.

Figure 3:
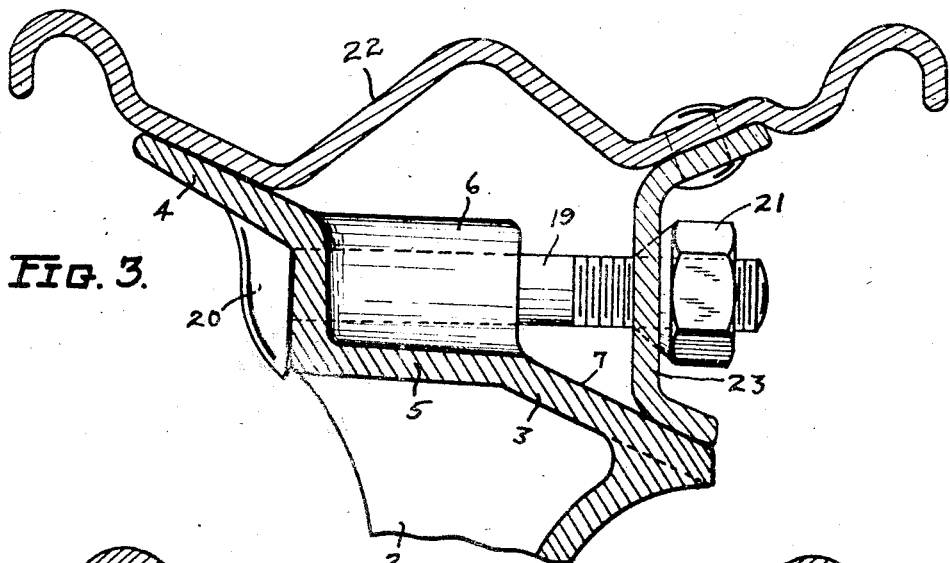
Figure 4:
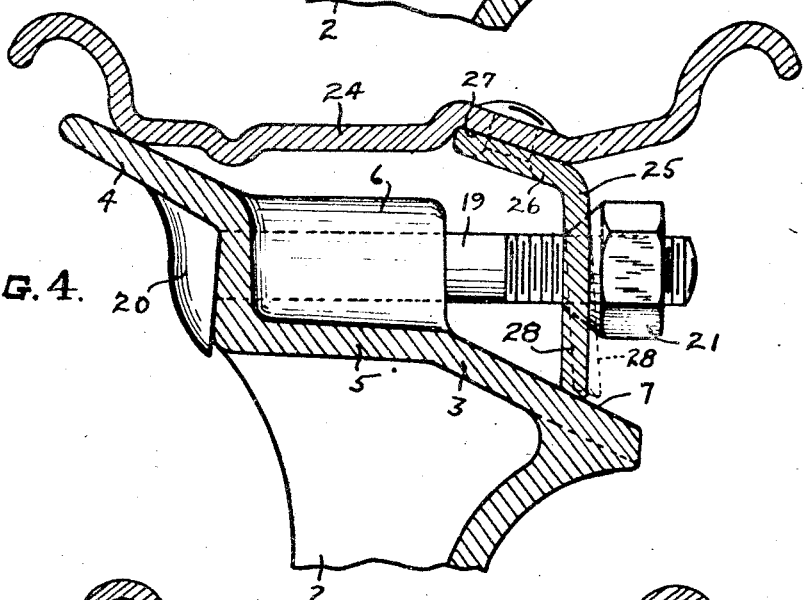
Figure 5:
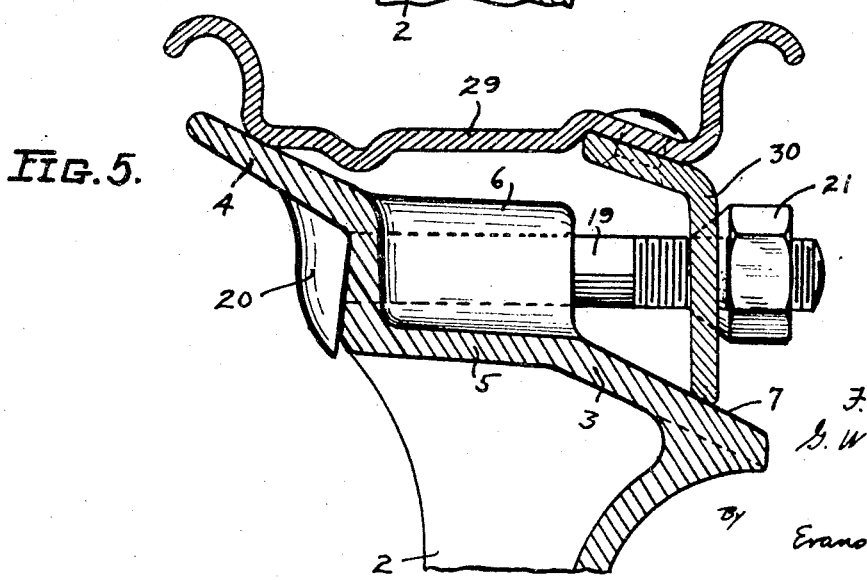

Figs. 3, 4 and 5 are transverse sections through the peripheral portion of the wheel and tire bases mounted thereon showing the tire bases of different widths and forms adapted for mounting on the wheel body. Fig. 3 shows a dual tire base of less width than the tire base shown in Figs. 1 and 2. Fig. 4 shows a base for a relatively wide single cushion tire. Fig. 5 shows a base for a relatively narrow cushion tire.

Referring to the accompanying drawings, the body portion of the wheel, with the exception of the peripheral tire base receiving the felloe portion, may be constructed in any suitable manner, but is herein illustrated as a cast wheel having a hub 1, spokes 2 integral with the hub and radiating therefrom, and a continuous felloe portion 3 formed integrally with the outer ends of the spokes.

The peripheral or felloe portion of the wheel body has along its inboard edge a laterally extending flange 4, which is inclined to provide a relatively wide tire base engaging seat of conical form tapering toward the outboard side of the wheel. The central portion 5 of the felloe is of substantially uniform diameter and offset radially inwardly from the inboard side flange 4. On this central portion of the periphery of the wheel body at circumferentially spaced points, there are formed integral bolt receiving bosses 6 provided with transverse apertures to receive clamping bolts which will be later described. The outboard edge portion of the felloe tapers toward the outboard side to provide a relatively wide conical seat 7 which merges into the central cylindrical portion of the felloe at its inner edge, the seat 7 being at substantially the same inclination as the flange 4 and offset radially inwardly with respect thereto.

In Fig. 2 of the drawing, a wide tire base 8 forming a support for a dual or twin tread cushion tire is shown mounted upon the wheel body. This tire base has a central circumferential raised portion 9 and circumferential channels 10 and 11 on opposite sides of the central raised portion 9 in which the base portions of the cushion tires are vulcanized.

The inboard channel 10 is formed to provide on the interior of the tire base an inclined seating face 12 which fits upon the conical surface of the inboard flange 4 of the felloe and the outboard channel 11 is provided with a bottom face 13 which is oppositely inclined with respect to the seating face 12. The exterior laterally extending portion 14 of a mounting flange 15 is rigidly secured against the interior inclined face 13 of the tire base. The interior of the tire base against which the laterally extending portion 14 is attached, is recessed and the portion 14 is expanded into the recess and riveted or otherwise rigidly secured therein so that the mounting flange forms an integral part of the tire base structure. The mounting flange serves to bridge the space between the tire base and the outboard seat 7 of the wheel body. The mounting flange 15 is in the form of a rolled channel shaped section and has an interior inclined edge portion 16 projecting in the same direction as the exterior portion 14. The interior edge portion 16 of the mounting flange 6 conforms to the outboard conical seat 7 of the wheel body and the body of the mounting flange is in the form of a vertically disposed web 17, which provides a continuous rigid support for the tire base.

At circumferentially spaced points corresponding to the spacing of the bolt receiving bosses, the web 17 of the mounting flange is provided with countersunk openings 18 adapted to be alined with the bolt openings of the bosses 6 and to receive clamping bolts 19. Each of the clamping bolts is provided with a head 20 formed to fit against the under side of the flange 4 and against the inboard side face of the felloe portion of the wheel inwardly of the flange so that the bolt is held against rotation. The outer threaded ends of the bolts project through the openings 18 of the mounting flange and upon the outside of the mounting flange receive nuts 21 which have tapered inner ends fitting in the countersunk openings 18 of the mounting flange.

In applying the tire bases to the wheel body, the tire base is slipped laterally onto the wheel body until the inner seating face 12 thereof engages the seating flange 4. The bolts 19 are then slipped through the felloe and mounting flange and the nuts 21 are tightened on the bolts to exert a lateral pressure upon the mounting flange to force the flange and tire base laterally into tight wedging engagement with the inclined seats.

The mounting flange, although very rigid with respect to thrusts in a radial direction or torsional stresses tending to distort the tire base, is formed of resilient metal stock and has a limited lateral flexibility.

The mounting flange is preferably so formed as to normally have an internal diameter such that when the inner shoulder 12 is brought into engagement with the seat 4, the inner seating edge 16 of the flange is spaced slightly from the seat 7, as shown in dotted lines in Fig. 2. When lateral pressure is exerted on the mounting flange by tightening the nuts 21, the flange is first bent inwardly into engagement with the seat 7 causing the web portion 17 to be positioned at a slight angle to the vertical. Further tightening of the nuts 21 tends to rock the flange about its inner edge as a fulcrum and to again bring the web portion 17 to vertical position, the latter movement of the mounting flange tending to expand the flange and exerting a radial thrust outwardly upon the interior of the tire base so that the flange is very tightly and rigidly held between the tire base and seat.

The resiliency of the mounting flange also provides a very secure lock for the clamping nuts since the nuts act to press the web portion of the ring out of its normal position so that the mounting flange due to its resiliency maintains an outward thrust on the nuts and acts upon each of the nuts in the same manner as a spring lock washer to hold the nuts against accidental turning movement.

Since the mounting flange is rigidly attached to the tire base and forms an integral part thereof, the lateral pressure exerted by the nut 21 is directly transmitted through the tire base to the inboard seating portion 12 so that direct inward pressure is exerted upon the portion of the tire base engaging the inboard seat of the wheel body as well as upon the portion of the mounting flange engaging the outer seat of the wheel body.

In service, the inboard portion of the tire base is rigidly supported upon the seating flange 4 and the outboard portion is rigidly supported upon the seat 7 by the vertically disposed web of the mounting flange. Loads imposed upon the tires in service, by reason of the rigid engagement of the tire base structure with the felloe seats tend to shift the tire base laterally, such movement being resisted by the nuts 21 so that the load is taken by the wheel body and nuts and no bending or shearing stresses are transmitted to the clamping bolts 19, except the relatively light driving thrust due to rotation of the wheels and the tendency of the tire base to slip circumferentially on the wheel body.

As heretofore explained, the present invention provides a tire base mounting which is universal for all widths of cushion tires and which permits the use of the same wheel for the front and rear of a truck and for trucks of different load capacities.

Figs. 3, 4 and 5 of the drawing show modified constructions of tire bases and mounting flanges, the tire bases being of various widths. The wheel structure in each case is, however, identical with that shown in Figs. 1 and 2 and the same reference numerals are applied to the parts of the wheel body shown in these views.

In Fig. 3 of the drawing, there is shown a twin tread tire base narrower than the tire base 22 shown in Fig. 2 and, rigidly attached to this tire base, there is a mounting flange 23 of a form similiar to the mounting flange shown in Fig. 2, the flange, however, having a shorter exterior attaching portion, since the overhang of this tire base is less than that of the tire base shown in Fig. 2.

Fig. 4 of the drawing shows a tire base adapted to carry a single relatively wide cushion tire and this tire base 24 has, rigidly attached thereto, a mounting flange 25 which has an inwardly extending outwardly inclined attaching portion 26 expanded into a groove 27 in the tire base and rigidly secured to the tire base by suitable means such as rivets. The mounting flange 25 has a vertically disposed flange 28 which has a beveled inner edge fitting upon the outer seat 7 of the felloe. In this modification, the vertical flange 28 of the mounting flange provides a continuous rigid support between the outer portion of the tire base and the outer seat 7 of the felloe, the flange 28 being apertured to receive the clamping bolts 19 and nuts 21 as in the modifications previously described.

Fig. 5 of the drawing shows a base 29 for a single relatively narrow cushion tire, the tire base having, rigidly attached thereto, a mounting flange 30 similar to the mounting flange 25 in the modification shown in Fig. 4. The mounting flange, however, is in this instance disposed beneath the outboard edge portion of the tire base so as to provide the proper spacing between the inner seat engaging portion of the tire base and the seat engaging portion of the mounting flange.

In all modifications, the mounting flange has an internal diameter such that its inner edge is normally spaced slightly from the seat 7 when the inner shoulder of the tire base first seats on the inner seat 5 of the wheel body, as indicated in dotted lines in Figs. 2 and 4, so as to obtain the combined wedging and expanding action as the nuts are tightened, as above explained in connection with Fig. 2 of the drawing.

Since the clamping bolts pass through the mounting flange and wheel body, each bolt and nut acts as a driving lug to transmit driving thrusts and prevents circumferential slipping of the tire base on the wheel body. Also, the bosses 6 provide rigid supports for the bolts extending quite close to the mounting flange so that the bolts have ample rigidity to take the driving thrusts.

It will be apparent that by providing the wheel body with the relatively wide tapered inboard and outboard seats with the outboard seat of smaller diameter and offset radially inwardly with respect to the inboard seat, a structure is provided which enables twin tread tire bases of various widths, as well as bases for single tires of various widths, to be mounted upon the same wheel body, so that one standard wheel will serve as a front wheel or as a rear wheel on trucks of various load capacities.

It will also be apparent that by providing a mounting flange rigidly attached to the tire base and provided with a vertically disposed web or flange portion bridging the space between the tire base and the outer seat of the wheel body, a very rigid support is provided for the tire base by which the pressure of the clamping bolts is transmitted directly to the tire base to force the same into tight engagement with the inboard peripheral seat of the wheel body, as well as to the flange engaging the outboard seat, whereby a tight wedging of the tire base on the wheel body and a rigid support for the tire base is insured.

Furthermore, it is to be understood that the particular form of apparatus shown and described, and the particular procedure set forth, are presented for purposes of explanation and illustration and that various modifications of said apparatus and procedure can be made without departing from our invention as defined in the appended claims.

What we claim is:

1. A wheel body designed to receive tire bases of different sizes and having a peripheral portion provided on its inboard side with a laterally projecting flange forming a relatively wide conical seat tapering toward the outboard side of the wheel body, and on its outboard side with a relatively wide seat tapering toward the outboard side of the wheel body and conforming to a conical surface lying within the conical surface of the inboard seat, said body having integral bolt receiving bosses located radially inwardly of the seat at the inboard side of the wheel body and radially outwardly of the seat at the outboard side of the wheel body.

2. A cast metal wheel body designed to receive tire bases of different sizes and having at its periphery along the inboard side thereof a laterally projecting flange, the outer surface of which conforms to a conical surface tapering toward the outboard side of the wheel body, integral transversely elongated bolt receiving bosses at the periphery of said body offset radially inwardly with respect to said flange, said body having a conical seat tapering toward the outboard side of the wheel body offset radially inwardly with respect to said bosses, said seats being relatively wide and adapted to accommodate tire bases of various widths.

3. In combination, a wheel for motor vehicles comprising a wheel body having at the inboard side thereof a peripheral seat which tapers toward the outboard side of the wheel body, said wheel body having an outboard edge portion of less diameter than the inboard edge portion and formed to provide a peripheral seat which tapers toward the outboard side of the wheel body, a tire base having an inboard seating portion engaging the inboard seat, a continuous mounting flange fixed to the interior of said tire base and engageable with the outboard seat, said mounting flange having a seat engaging portion projecting radially inwardly from said tire base and formed to occupy a position laterally outwardly of its seat engaging position when free of lateral pressure said flange being resilient and laterally flexible whereby it may be deflected by lateral pressure into seat engaging position, and means for applying lateral pressure to said flange to spring the same inwardly to seat engaging position and to force the flange and tire base into wedging engagement with the seats of the wheel body.

4. In combination, a wheel for motor vehicles comprising a wheel body having at the inboard side thereof a peripheral seat which tapers toward the outboard side of the wheel body, said wheel body having an outboard edge portion of less diameter than the inboard edge portion and formed to provide a peripheral seat which tapers toward the outboard side of the wheel body, a tire base having an inboard seating portion engaging the inboard seat, a continuous mounting flange fixed to the interior of said tire base and engageable with the outboard seat, said mounting flange having a seat engaging portion projecting radially inwardly from said tire base and formed to occupy a position laterally outwardly of its seat engaging position when free of lateral pressure, said flange being resilient and laterally flexible whereby it may be deflected by lateral pressure into seat engaging position, said mounting flange having a substantially vertical web and an outwardly bent inclined inner edge portion for engagement with the outer seat of the wheel body, and clamping bolts passing transversely through said web and connecting the same to the wheel body.

5. In combination, a wheel for motor vehicles comprising a wheel body having at the inboard side thereof a peripheral seat which tapers toward the outboard side of the wheel body, said wheel body having an outboard edge portion of less diameter than the inboard edge portion and formed to provide a peripheral seat which tapers toward the outboard side of the wheel body, a tire base having an inboard seating portion engaging the inboard seat, a continuous mounting flange fixed to the interior of said tire base and engageable with the outboard seat, said mounting flange having a portion projecting radially inwardly from said tire base and formed to occupy a position laterally outwardly of its seat engaging position when free of lateral pressure, said flange being resilient and laterally flexible whereby it may be deflected by lateral pressure into seat engaging position, and clamping bolts extending laterally through said flange centrally thereof and through the wheel body exteriorly of the outboard seat and interiorly of the inboard seat.

6. In combination, a wheel for motor vehicles comprising a wheel body having at the inboard side thereof a peripheral seat which tapers toward the outboard side of the wheel body, said wheel body having an outboard edge portion of less diameter than the inboard edge portion and formed to provide a peripheral seat which tapers toward the outboard side of the wheel body, a tire base having an inboard seating portion engaging the inboard seat, a continuous mounting flange fixed to the interior of said tire base and engageable with the outboard seat, said mounting flange having a seat engaging portion projecting radially inwardly from said tire base and formed to occupy a position laterally outwardly of its seat engaging position when free of lateral pressure, said flange being resilient and laterally flexible whereby it may be deflected by lateral pressure into seat engaging position, clamping bolts extending laterally through said mounting flange and wheel body, and clamping nuts on said bolts engageable with the outer face of the flange to spring the same into engagement with the outer seat of the wheel body, said flange exerting an outward spring pressure on said nuts.

In testimony whereof we affix our signatures.

FRED R. KLAUS.
GEORGE W. SEIBERLING.